(12) United States Patent
Hardy et al.

(10) Patent No.: US 7,775,311 B1
(45) Date of Patent: Aug. 17, 2010

(54) HOUSING FOR VEHICLE POWER SYSTEMS

(75) Inventors: David R. Hardy, Hephzibah, GA (US);
Christopher D. Cosby, Augusta, GA (US); Duane E. Newman, Evans, GA (US); Douglas T. Crow, Martinez, GA (US); Gary L. Lewis, Evans, GA (US); Paul E. Morgan, Appling, GA (US); Gerald C. Skelton, Evans, GA (US); Michael L. Welsh, Evans, GA (US)

(73) Assignee: Club Car, Inc., Evans, GA (US)

( * ) Notice: Subject to any disclaimer, the term of this patent is extended or adjusted under 35 U.S.C. 154(b) by 726 days.

(21) Appl. No.: 10/543,871

(22) PCT Filed: Jan. 27, 2004

(86) PCT No.: PCT/US2004/002239

§ 371 (c)(1),
(2), (4) Date: Jul. 28, 2005

(87) PCT Pub. No.: WO2004/067361

PCT Pub. Date: Aug. 12, 2004

Related U.S. Application Data

(60) Provisional application No. 60/443,279, filed on Jan. 28, 2003.

(51) Int. Cl.
*B60R 16/04* (2006.01)
*B60K 1/00* (2006.01)
(52) U.S. Cl. .................................. 180/68.5; 180/291

(58) Field of Classification Search ................. 180/291, 180/65.1, 68.5
See application file for complete search history.

(56) References Cited

U.S. PATENT DOCUMENTS

| | | | | |
|---|---|---|---|---|
| 2,104,766 | A | * | 1/1938 | Saunders .................... 180/68.5 |
| 3,199,621 | A | | 8/1965 | Seaman |
| 3,330,371 | A | | 7/1967 | Seaman |
| 3,904,947 | A | * | 9/1975 | Crews ......................... 320/138 |
| 4,020,916 | A | | 5/1977 | Noble |

(Continued)

FOREIGN PATENT DOCUMENTS

EP         1 288 114 A2     3/2003

(Continued)

*Primary Examiner*—Hau V Phan
*Assistant Examiner*—John R Olszewski
(74) *Attorney, Agent, or Firm*—Michael Best & Friedrich LLP

(57) ABSTRACT

A housing (10) is for containing an energy source (2), such as a fuel tank, battery or fuel cell, and other power system components of a vehicle having a seat (4). The housing includes a body (12), preferably a generally rectangular box, connectable with the vehicle and configured to support the seat. The body has an interior space sized to receive the energy source and the other power system components, such that the energy source and other components are supported by the body, including when the body is unconnected with the vehicle.

26 Claims, 14 Drawing Sheets

U.S. PATENT DOCUMENTS

| | | |
|---|---|---|
| 4,042,054 A | 8/1977 | Ward |
| 4,042,055 A | 8/1977 | Ward |
| 4,317,497 A | 3/1982 | Alt et al. |
| 4,355,695 A * | 10/1982 | Leskovec ................... 180/68.5 |
| 4,397,365 A | 8/1983 | Harbe et al. |
| 4,696,508 A * | 9/1987 | Brautigam .............. 296/65.05 |
| 4,834,424 A * | 5/1989 | Link ......................... 280/785 |
| 4,930,591 A * | 6/1990 | Lanius et al. ............. 180/65.1 |
| 4,967,864 A | 11/1990 | Boyer et al. |
| 5,193,635 A | 3/1993 | Mizuno et al. |
| 5,238,267 A * | 8/1993 | Hutchison et al. ........... 280/781 |
| 5,513,721 A | 5/1996 | Ogawa et al. |
| 5,556,441 A * | 9/1996 | Courtwright et al. .......... 55/502 |
| 5,704,644 A * | 1/1998 | Jaggi .......................... 280/796 |
| 5,789,898 A | 8/1998 | Suzuki et al. |
| 5,836,412 A | 11/1998 | Lyles et al. |
| 5,924,514 A | 7/1999 | Bullerdick |
| 5,983,612 A | 11/1999 | Bauswell et al. |
| 6,186,256 B1 * | 2/2001 | Dignitti ..................... 180/68.5 |
| 6,394,555 B2 | 5/2002 | Mizuta et al. |
| 6,699,616 B2 * | 3/2004 | Wu .............................. 429/98 |
| 7,559,389 B2 * | 7/2009 | Yamashita ............... 180/65.31 |

FOREIGN PATENT DOCUMENTS

| | | |
|---|---|---|
| JP | 8295137 A | 11/1996 |
| JP | 2002063884 | 2/2002 |

\* cited by examiner

HOUSING FOR VEHICLE POWER SYSTEMS

RELATED APPLICATIONS

This application is a 371 of PCT/US2004/002239, filed on Jan. 27, 2004, which claims the benefit of U.S. Provisional Patent Application 60/443,279, filed on Jan. 28, 2003.

BACKGROUND OF THE INVENTION

The present invention relates to vehicles such as golf cars, utility vehicles, and NVs, and more particularly to power systems for such vehicles.

Vehicles such as golf cars, utility vehicles, neighborhood electric vehicles ("NVs") are known and generally include the same basic components. Such components include a frame, a body mounted to the frame, three or four wheels rotatably connected with the frame and a power system attached to the frame and operably connected with at least one wheel drive assembly to drive the wheels and thereby mobilize the vehicle. Historically, power systems included either a gas-fueled internal combustion engine or an electric motor, and power components necessary to operate the engine or motor. More recently, vehicles have been developed that are powered by other sources of energy, such as fuel cells or compressed air, and/or by engines capable of converting the particular energy sources to mechanical motion, such as for example, a pneumatic motor.

With vehicles powered by internal combustion engines, the power system components generally include a fuel tank, an air intake, a starter battery, a solenoid, etc. With an electric motor powered vehicles, the power system typically includes one or more batteries and a solenoid, and may include a controller or other electrical components. Generally, with either type of vehicle, each of the power system components is separately installed at various locations on the vehicle and is either mounted to the frame and/or to the body.

SUMMARY OF THE INVENTION

In one aspect, the present invention is a housing for containing an energy source of a vehicle, the vehicle having a seat. The housing comprises a body connectable with the vehicle and configured to support the seat. The body has an interior space sized to receive the energy source such that the energy source is supported by the body.

In another aspect, the present invention is a housing for containing an energy source of a vehicle, the energy source including at least one of a fuel tank, a battery, and a fuel cell. The housing comprises a generally rectangular box connectable with the vehicle and having an interior space sized to receive at least one of the fuel tank, the battery and the fuel cell.

In a further aspect, the present invention is a vehicle comprising a frame and an internal combustion engine mounted to the frame. A housing is connected with the frame and has an interior space. Further, a fuel tank is disposed within the housing interior space and is fluidly connected with the engine, the fuel tank being supported by the housing.

In yet another aspect, the present invention is a vehicle comprising a frame and an electric motor mounted to the frame. A housing is connected with the frame and has an interior space. Further, a battery is disposed within the housing interior space and is electrically connected with the motor, the battery being supported by the housing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
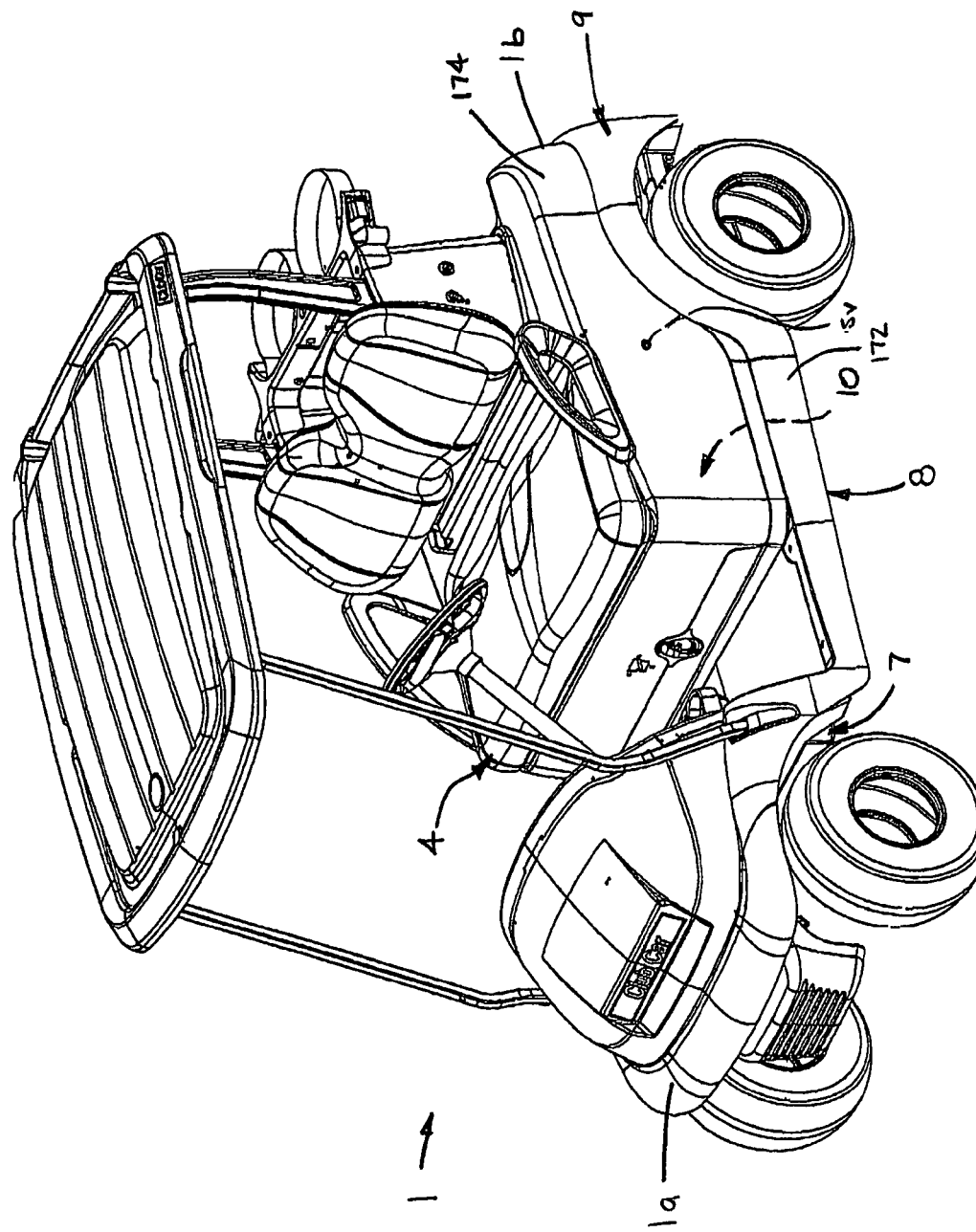
FIG. 1 is a perspective view of a vehicle including a power system housing in accordance with the present invention.

Certain terminology is used in the following description for convenience only and is not limiting. The words "lower", "upper", "upward", "down" and "downward" designate directions in the drawings to which reference is made. The words "front", "frontwardly" and "rear", "rearwardly" refer to directions toward and away from, respectively, a designated front of a vehicle 1 or a housing 10, the meaning intended being apparent from the context of the description. Further, the words "inner", "inwardly" and "outer", "outwardly" refer to directions toward and away from, respectively, the geometric center of the housing 10 or an element of the housing 10 being described, the particular meaning being readily apparent from the context of the description. In addition, as used herein, the word "connected" is intended to include both direct connections between two members without any other members interposed therebetween and indirect connections between members in which one or more other members are interposed therebetween. The terminology includes the words specifically mentioned above, derivatives thereof, and words or similar import.

Referring now to the drawings in detail, wherein like numbers are used to indicate like elements throughout, there is shown in FIGS. 1-18 a presently preferred embodiment of a power system housing 10 for containing an energy source 2 and other power system components of a vehicle 1, the vehicle 1 also having an engine 3 and a seat 4. The housing 10 basically comprises a body 12 connectable with the vehicle 1 and configured to support the seat 4. The housing 10 has an interior space $S_H$ sized to receive at least the energy source 2, and preferably other power system components associated with the energy source 2 and/or the engine 3, as discussed below, such that the energy source 2 (and other components) is/are supported by the body 12. More specifically, the housing body 12 is configured to support the energy source 2 (and power components) when the body 12 is unconnected with or separate from the vehicle 1. Thus, the energy source 2 and power system components may be installed within the housing 10 prior to connecting the housing 10 with the vehicle 1. Further, the energy source 2 and other power components (described below) may be removed from the vehicle 1 as a single unit by disconnecting the housing 10 from the vehicle 1, as discussed below.

Preferably, the energy source 2 includes a fuel tank 5, a battery 6, a fuel cell (not shown), or/and any other source(s) of energy useable to power a vehicle (none shown), and the body interior space $S_H$ is sized to receive the fuel tank 5, the battery 6, the fuel cell, etc., along with other associated components as discussed below. Further, the housing 10 is preferably used with a vehicle 1 that further has a frame 7 and a body 8 mounted on the frame 4, the body 8 having an interior space $S_V$. The housing body 12 is preferably disposeable within the vehicle body interior space $S_V$ so as to reinforce the vehicle body 8, as described in further detail below. Having described the basic elements of the present invention, a detailed description of the power system housing 10 is provided below.

Referring first to FIGS. 1, 3, 5, 13, 17 and 18, the power housing 10 of the present invention is preferably used with the category of generally light-weight, relatively limited range vehicles that includes golf cars, utility vehicles, neighborhood vehicles ("NVs") and similar types of vehicles. Preferably, the vehicle 1 has a front end 1a, a rear end 1b and includes a plurality of wheels (e.g., three or four) rotatably mounted to the frame 7 for mobilizing the vehicle 1. The body 8 preferably includes a rear body portion 9 having an opening 9a through which a portion of the housing extends, as discussed below. Further, the frame 7 preferably includes a pair of laterally spaced apart, elongated rails 7a, 7b extending longitudinally between the vehicle front and rear ends 1a, 1b, respectively.

Preferably, the engine 3 is either an internal combustion engine 11 (FIGS. 3 and 5) or an electric motor 13 (FIG. 13), but may alternatively include both an internal combustion engine and a motor (arrangement not shown) if the vehicle 1 is a "hybrid" vehicle. Further, the electric motor 13 is preferably powered by electric batteries 6, but may alternatively be configured to be powered by a fuel cell (not shown), either alone or in combination with the electric batteries 6. It should be noted that as used herein, the term "engine" encompasses all machines for converting energy into mechanical motion and appropriately used to power a vehicle, such that the term "energy source" encompasses any source of energy or power for such engines. For example, the engine 3 may also be a pneumatic motor, such that the energy source may be a storage tank containing compressed air (or a compressor), or a hydraulic motor, such that energy source includes a fluid reservoir and a pump (none shown).

Although the housing 10 is preferably used with a vehicle 1 as described above, the housing 10 may alternatively be used with any other type of vehicle 1 for which the power system housing 10 may be useful. For example, the housing 10 may be used with tractors, lawnmowers, etc. The scope of the present invention encompasses these and all other alternative vehicle structures and the housing 10 of the present invention is not limited to being used with any particular vehicle 1.

Referring to FIGS. 2-6 and 7-14, the housing body 12 is preferably bucket-like or formed as a generally rectangular box 14 with an open upper end 16. More specifically, the body 12 includes a generally horizontal base wall 18 and a generally vertical sidewall 20 extending about the outer edges or perimeter of the base wall 18. The base wall 18 is preferably generally rectangular shaped and is configured to support the energy source 2, specifically upon the base wall upper, inner surface 19. In other words, the base wall 18, either alone or in conjunction with the sidewall 20, supports the weight of the energy source 2 and other power system components, as discussed below. Preferably, the base wall 18 and the sidewall 20 are integrally formed or connected, such that the housing body 12 is of one-piece construction, but the base wall 18 and sidewall 20 may be provided by separate pieces attached together by appropriate means (e.g., fasteners, interlocking tabs, brackets, etc.).

Referring to FIGS. 2-5 and 7-14, the base wall 18 is preferably disposeable upon and connected with the rails 7a, 7b of the vehicle frame 7. More specifically, the base wall lower, outer surface 21 includes two generally flat, rectangular mounting surface sections 26 spaced laterally across the base wall 18 so as to each be disposeable upon a separate one of the rails 7a or 7b, as indicated by dashed lines in FIG. 12. Further, the base wall 18 preferably has four mounting through holes 29, each hole 29 being disposed at a longitudinal end of a separate one of the two mounting surfaces 26 and alignable with a corresponding opening (not shown) in one of the rails 7a or 7b. A threaded fastener (not indicated) is inserted through each mounting hole 29 and into the rail 7a or 7b to removably connect the housing 10 with the vehicle 1. However, the housing body 12 may alternatively be connected with the frame 7 by any other appropriate means, such as for example, permanently attaching (not preferred) the body 12 by rivets, braising or welding (i.e., if with a body 12 formed of a metallic material) and/or may be connected to the vehicle body 8 or another appropriate portion of the vehicle 1.

Referring to FIGS. 2, 7, 8, 12 and 14, the base wall 18 preferably further includes a plurality of generally rectangular projection "formations" or assemblies 22 integrally formed in the wall 18. Each base projection assembly 22 includes an outer, generally rectangular drain pan portion 23 and a plurality of elongated support bar portions 24 disposed within the pan portion 23, and may also include one or more generally rectangular retainer tab portions 25. The pan portion or drain pan 23 projects outwardly from the base wall lower surface 21 and has an upper surface 27 spaced vertically lower than a remainder of the base wall upper, inner surface 19. As such, each pan 23 provides a recess or sink for collecting any fluids (e.g., battery fluid, gasoline, wash water, etc.)

that may flow onto the base wall upper surface 19. Each pan 23 preferably includes at least one drain hole 31 for emptying or discharging any fluids from the pan 23, and thus removing the fluid(s) from the housing 10. However, these drain holes 31 may be omitted or may be pluggable for certain applications where it is desired to fluidly seal the housing 10, as discussed below.

Further, the support bar portions or bars 24 each project outwardly from the pan upper, inner surface 27 so as to extend level with or above a remainder (i.e., portions other than the projection assemblies 22) of the base wall upper, inner surface 19. The support bars 24 are configured to support various components disposed within the housing 10, such as the energy source 2, and each has an upper surface 24*a* upon which these components are disposeable, as discussed in further detail below. Furthermore, the retainer tab portion or tab 25 is disposed proximal to the support bars 24 and extends upwardly from the pan inner surface 27 so as to project upwardly above the support bars 24 and the remainder of the base inner surface 19. The retainer tabs 25 function to locate and retain certain power system components disposed on specific sections of the base wall surface 19, as described below. Besides providing the features described above, the base projection assemblies 22 also function to stiffen or reinforce the base wall 18 so as to increase the capability of the wall 18 to resist bending and to otherwise support a greater weight of the energy source 2 and other power system components. Although preferably including the base projection assemblies 22, the base wall 18 may alternatively be formed without the projection assemblies 22. For example, the base wall 18 may be formed as a substantially flat plate (not shown), such that separate retainer tabs or projections may be attached to the wall upper surface 19 and for use in retaining the various power system components, as discussed below.

Referring to FIGS. 2-14, the sidewall 20 is preferably generally continuous and has a lower end 20*a* connected with and extending at least partially, and preferably entirely, about the outer perimeter of the base wall 18 and an upper end 20*b* defining an access opening 28 into the interior space $S_H$. The sidewall upper end 20*b* provides a support surface 30 that extends about the access opening 28 and is configured to support the seat 4, i.e., when the seat 4 is connected with the body 12. Preferably, the sidewall 20 also includes a horizontal lip or ledge 32 that extends substantially completely about the entire perimeter of the wall upper end 20*b* and provides the support surface 30, as discussed in further detail below.

Preferably, the sidewall 20 is generally rectangular-shaped and includes four connected wall sections: a front wall section 34, an opposing rear wall section 36, and left and right opposing side sections 38, 40, respectively, extending between the respective front and rear sections 34 and 36. It must be noted that the designations of "front", "rear", "left" and "right" as used herein are intended to indicate the orientation of the particular sidewall section 34, 36, 38 or 40 with respect to the vehicle 1 when the housing 10 is mounted on the frame 7. Preferably, the four wall sections 34, 36, 38, 40 are integrally connected or formed, but the sidewall 20 may alternatively be provided by four (or more) separate pieces assembled or connected together by any appropriate means (e.g., interlocking tabs, fasteners, plastic fusion, etc.). Further, the sidewall 20 may alternatively formed so as to have any other appropriate shape, such as generally ovular or elliptical and/or may be non-continuous, so as to extend about only a portion or portions of the base wall outer perimeter. Preferably, each sidewall section 34, 36, 38 and 40 includes a plurality of stiffening or reinforcing recesses 33 for increasing the strength and rigidity of the sidewall 20, and particularly increasing the capacity of the housing 10 to support weight upon the seat 4.

Referring to FIGS. 2-10 and 12-14, the front sidewall section 34 preferably includes a pair of hinge openings 42 which each receive one portion of a hinge 44, the other hinge portion being attached with the seat 4 so as to connect the seat 4 with the housing 10. By using the hinges 44 to connect the seat 4 to the housing 10, the seat 4 is movable in generally longitudinal or "frontward" and "rearward" directions between a first seat position $P_1$ (FIG. 5) and a second seat position $P_2$ (FIG. 6), as indicated by a designated point "P" on the seat 4. In the first seat position $P_1$, the seat 4 is disposed generally against the support surface 30 so as to generally cover or obstruct the access opening 28. In the second position $P_2$, the seat 4 is spaced from the support surface 30 so as to permit access to the housing interior space $S_H$ through the access opening 28. However, the seat 4 may alternatively be connected with the housing 10 in any other appropriate manner, such as for example, by being fixedly or non-movably attached to the housing 10 (e.g., by threaded fasteners) or hingedly connected with either the left or right sidewall sections 38, 40 so as to move in generally transverse or "leftward" and "rightward" directions.

Figure 3:
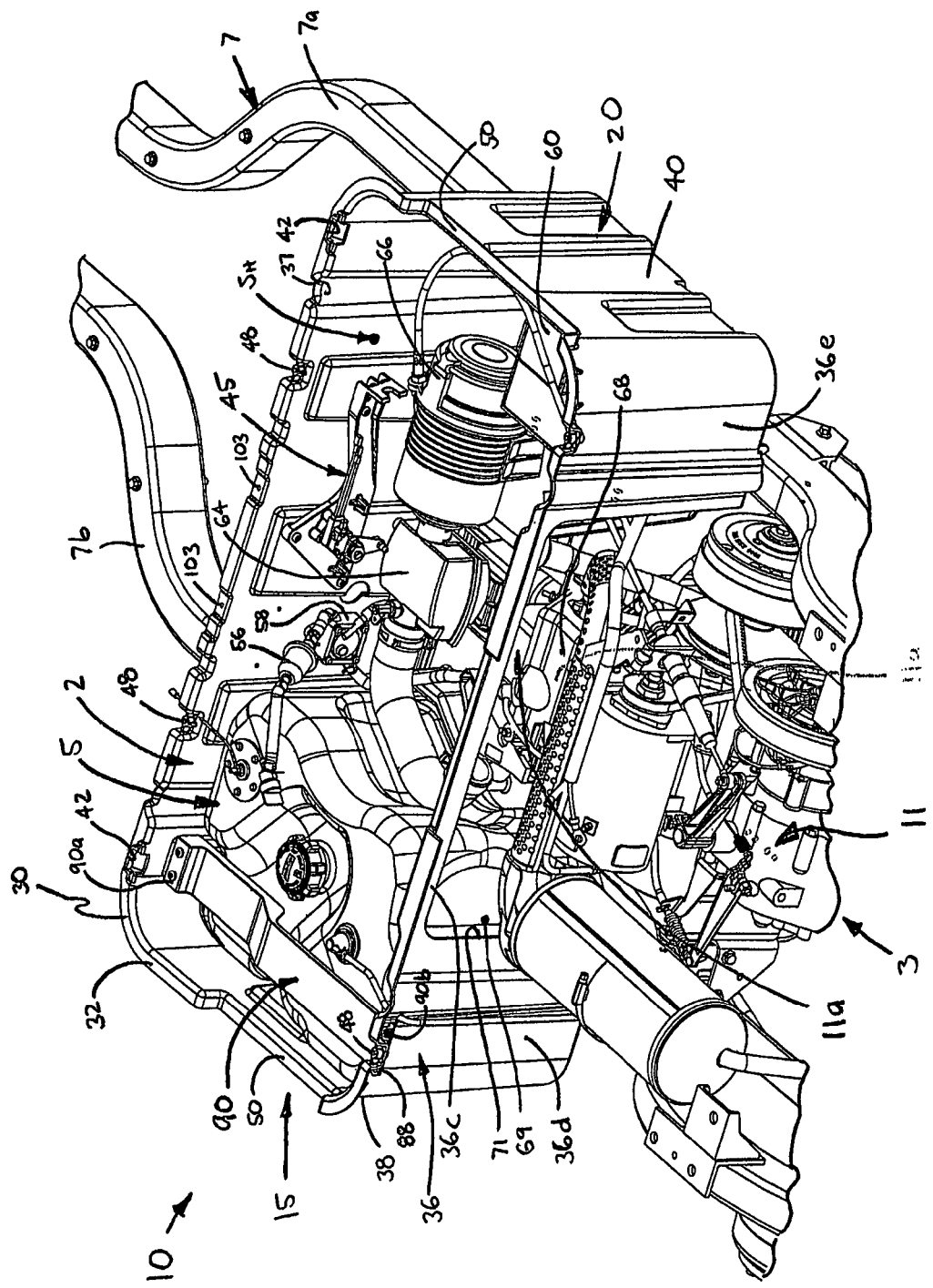
FIG. 3 is a rear perspective view of the fuel bucket housing, showing the housing mounted to a frame of the vehicle and disposed about an internal combustion engine.
Figure 4:
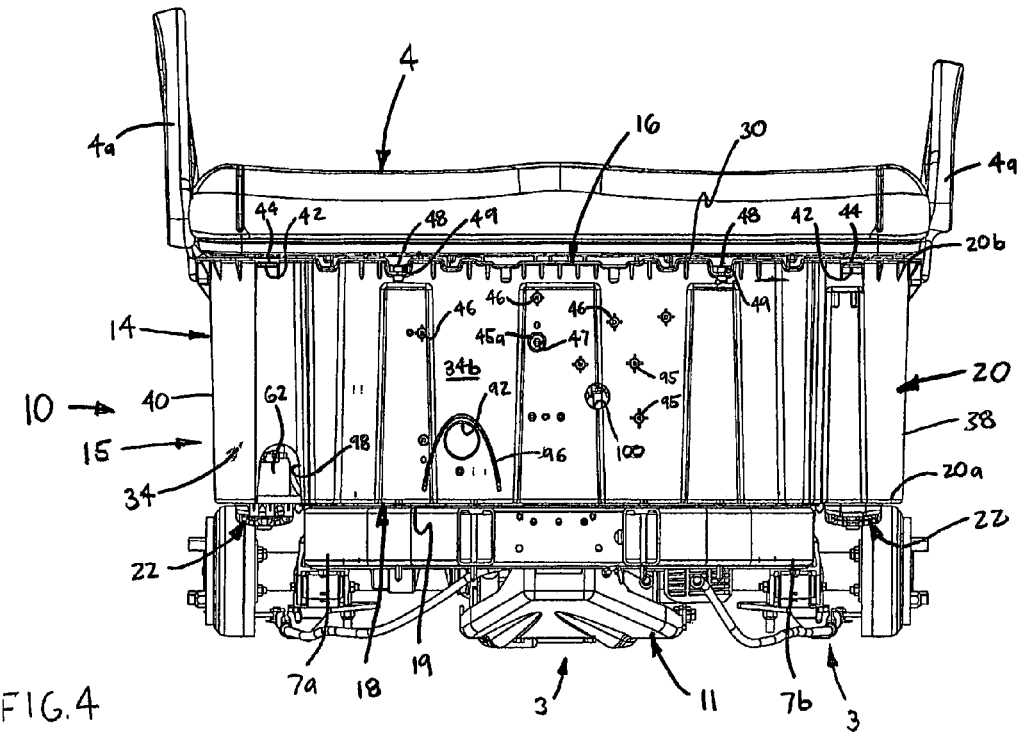
FIG. 4 is a front elevational view of the fuel bucket housing.
Figure 5:
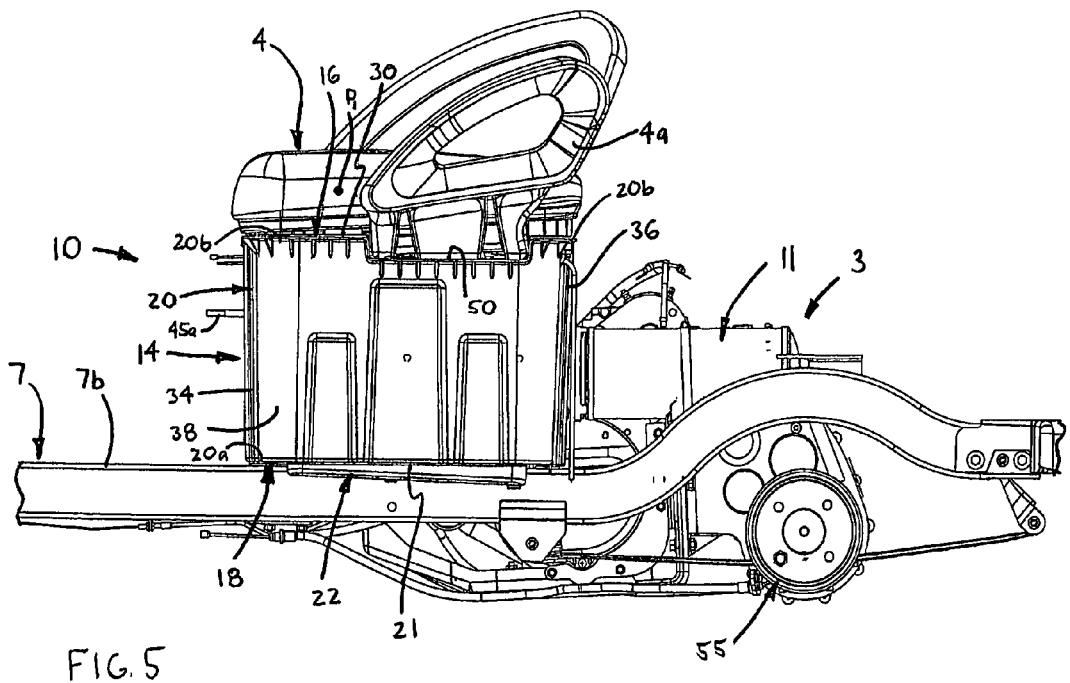
FIG. 5 is a side elevational view of the fuel bucket housing, shown disposed about the engine and with a seat in a first, closed position.
Figure 6:
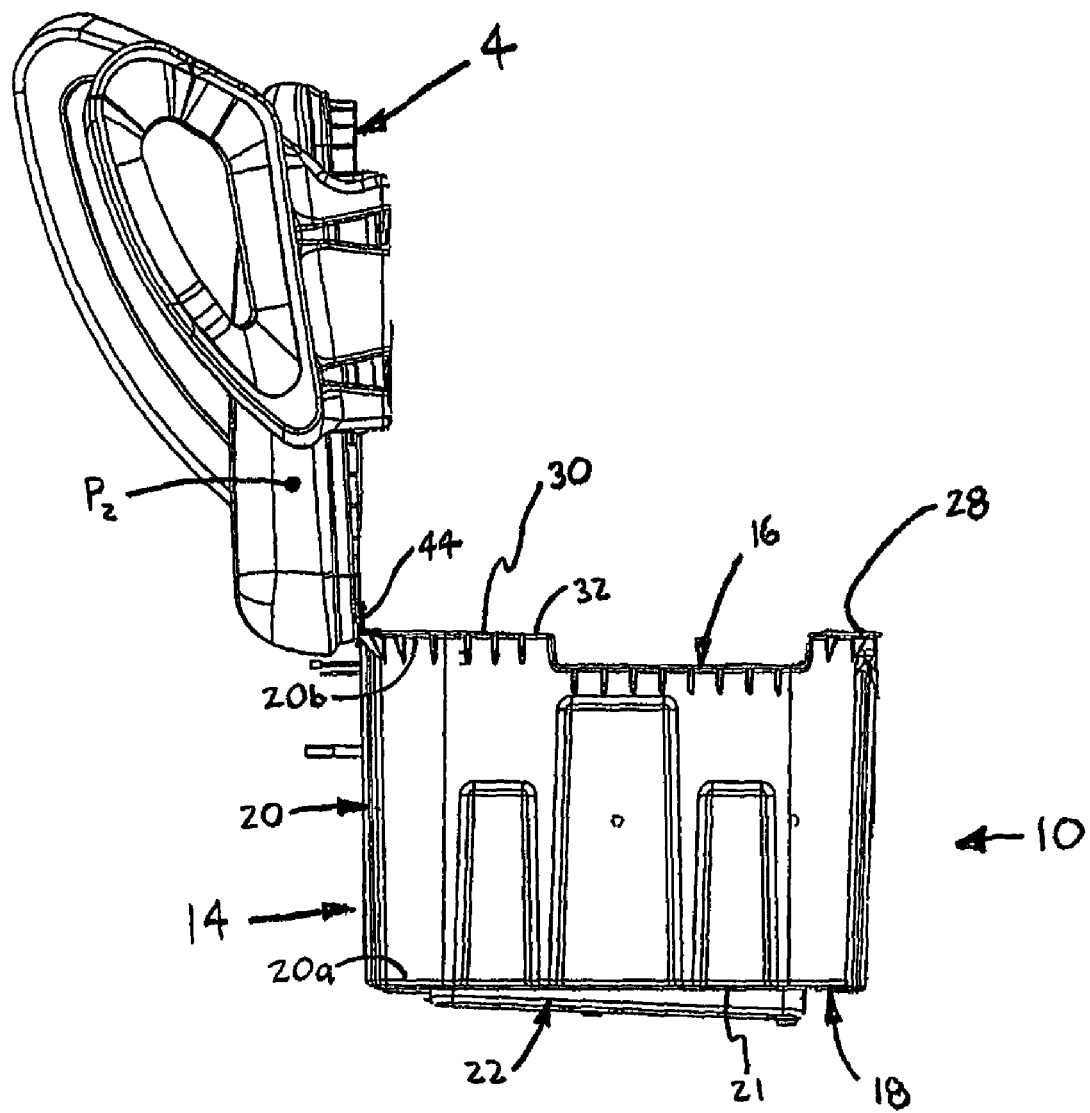
FIG. 6 is a side elevational view of the fuel bucket housing, shown with the seat in a second, open position.
Figure 7:
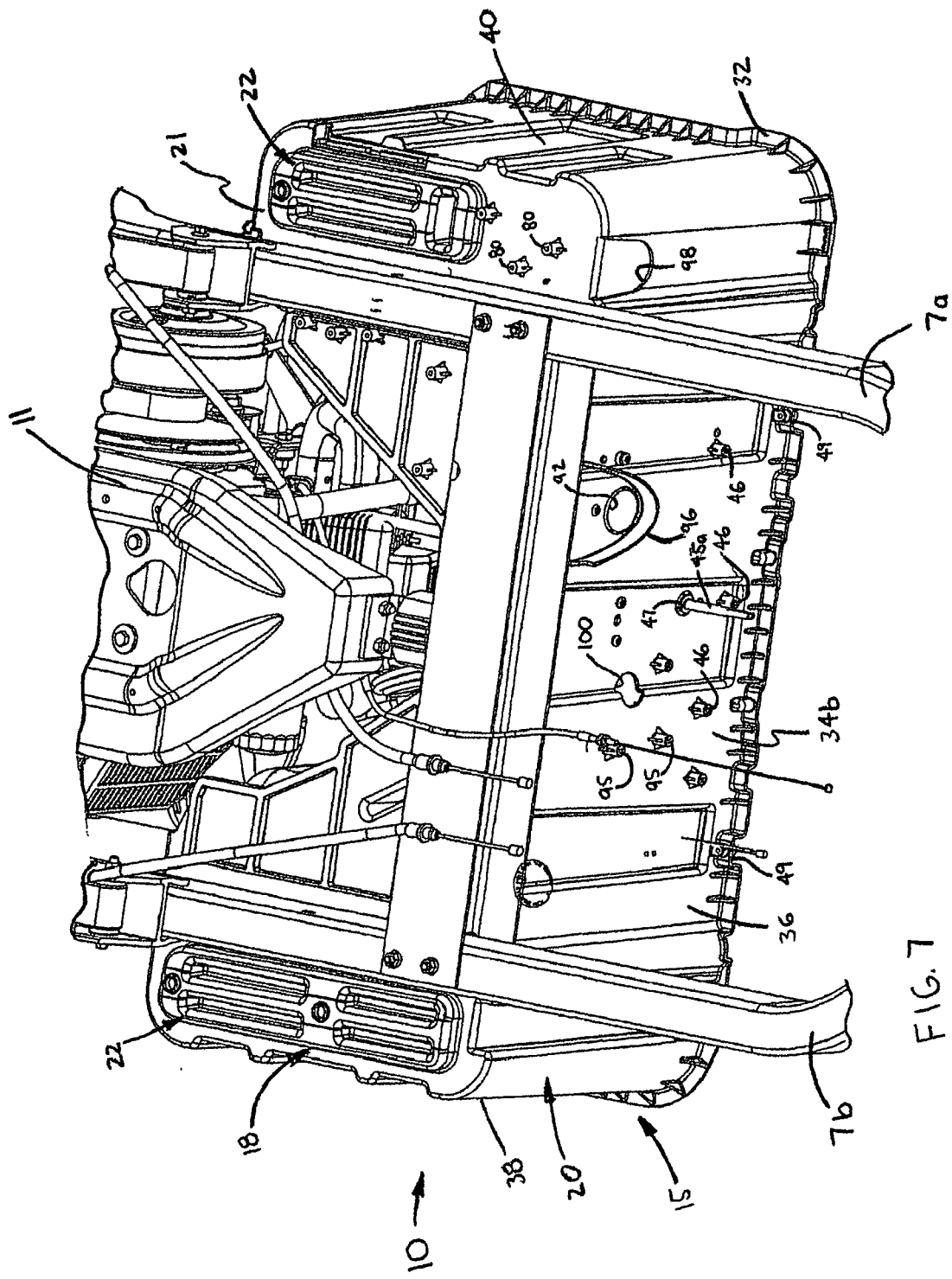
FIG. 7 is bottom perspective view of the fuel bucket housing, shown connected with the vehicle frame and disposed about the engine.

Referring to FIGS. 3-5, 7-10 and 12, the front sidewall section 34 preferably includes a plurality of mounting holes 46, preferably three holes 46 provided within self-threading posts, and a clearance hole 47 configured to mount a forward-reverse ("F-R") lever assembly 45 (FIG. 3) that is operably connected with the transmission (not shown) of the vehicle 1, to the housing 10. Specifically, the lever assembly 45 is attached to the inner surface 34*a* of the front sidewall section 34 by the fasteners (not shown) inserted through the mounting holes 46. Further, an operating rod portion 45*a* of the lever 45 extends through the clearance hole 47 and extends outwardly from the front wall outer surface 34*b* so as to be accessible to a vehicle operator disposed on the seat 4, as best shown in FIGS. 5 and 7.

Figure 2:
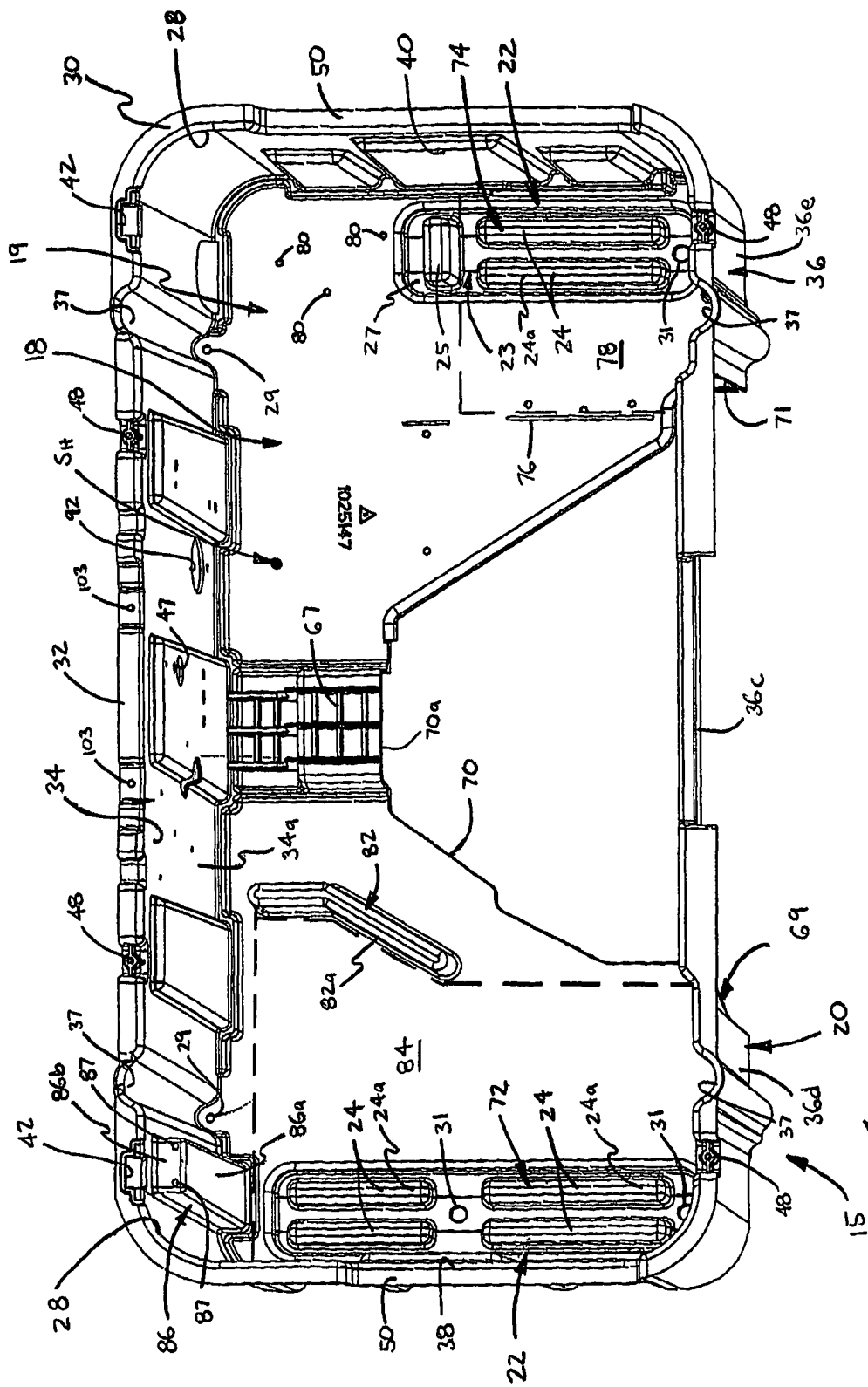
FIG. 2 is a top perspective view of a first preferred construction of the housing, or a "fuel bucket", used with gas powered vehicles.
Figure 12:
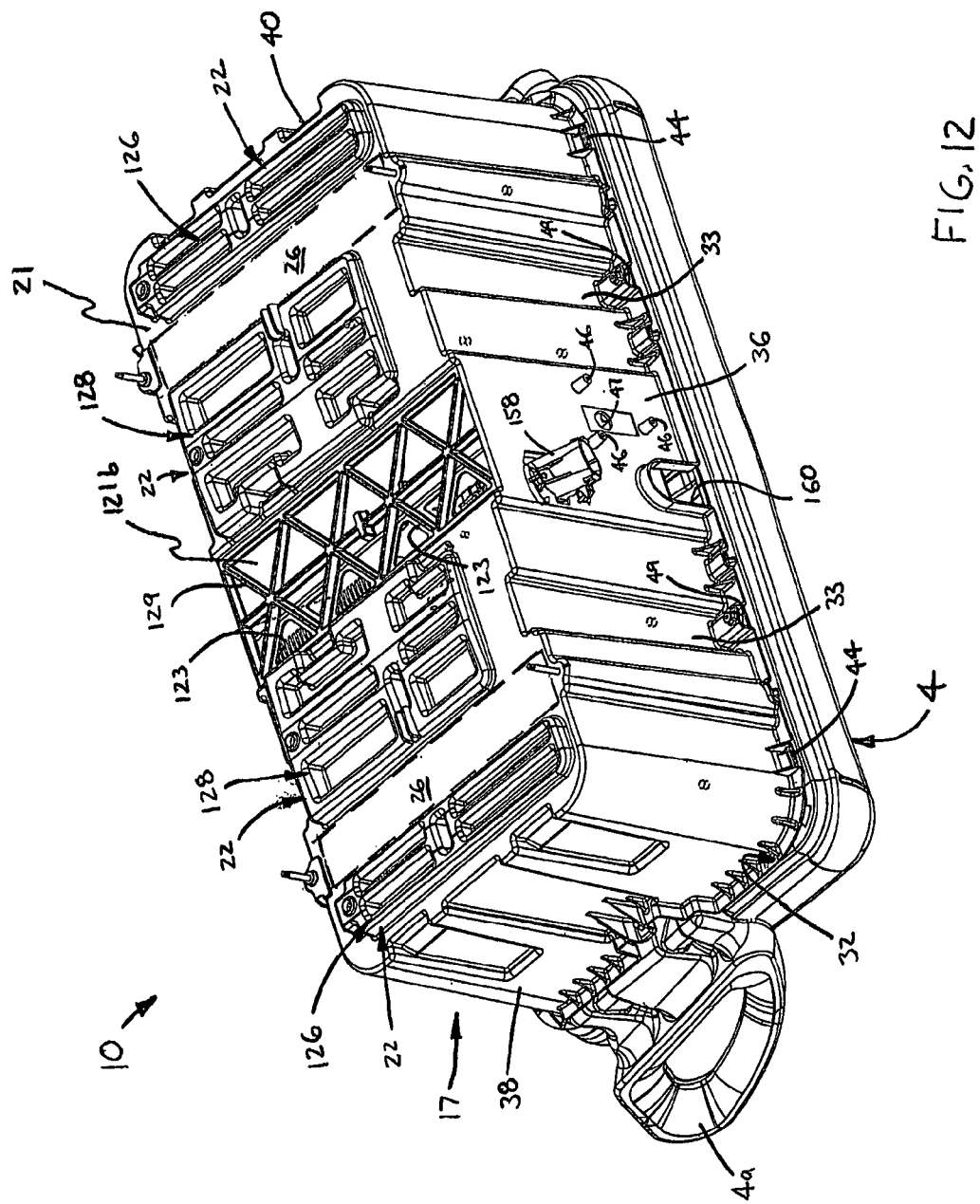
FIG. 12 is a bottom perspective view of the electric bucket housing.
Figure 13:
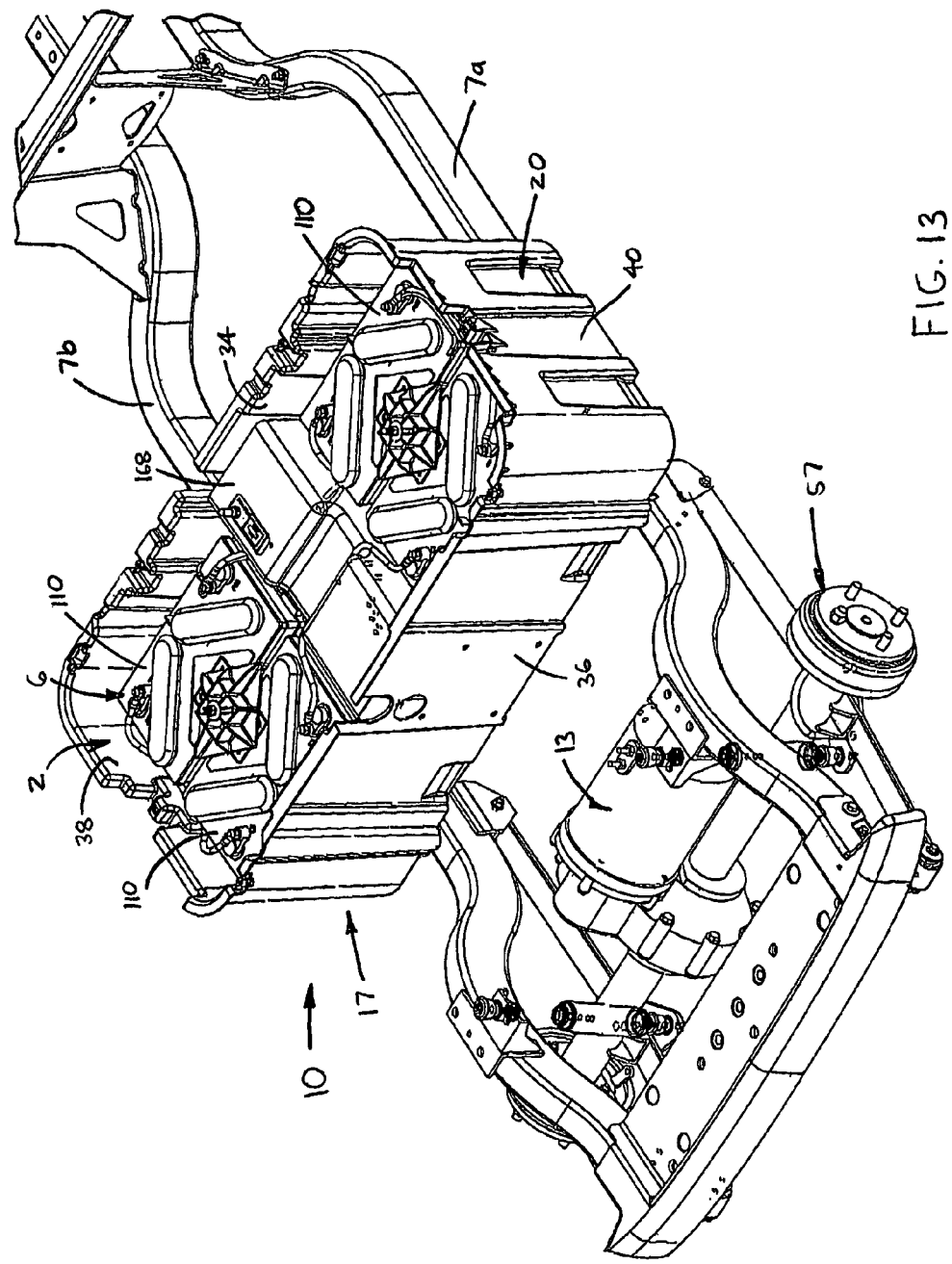
FIG. 13 is rear perspective view of the electric bucket housing, shown mounted to the frame.

Referring to FIGS. 2-4, 7-10 and 12-14, the front sidewall section 34 and the rear sidewall section 36 each include a pair of connective openings 48, each preferably provided by a self-threading post disposed in a separate recess 49 of the upper ledge 32. The connective openings 48 are used to connect the vehicle rear body portion 9 to the power housing 10. More specifically, portions of the wall 9*b* surrounding the opening 9*a* are attached to the housing 10 by means of threaded fasteners inserted through the wall 9*a* and into the connective openings 48, as shown in FIG. 19 and discussed in further detail below. Further, the front and rear sidewall sections 34 and 36 each preferably further include a pair of semicircular clearance recesses 37 each extending into the wall inner surfaces 34*a*, 36*a*, respectively, about one of the mounting holes 29 and extending from the base wall 18 to the upper ledge 32. The clearance recesses 37 enable a fastening tool, such as a socket wrench, to insert fasteners into the mounting holes 29 in order to connect the housing 10 to the vehicle frame 7 (as described above), even when the energy source 2 and other components are installed within the housing interior space $S_H$. Furthermore, the left and right sidewall sections 38, 40, respectively, each preferably include an arm support recess 50 extending downwardly from the sidewall upper end 20*b* and providing clearance for the lower portion of a proximal arm support 4*a* attached to the seat 4, as shown in FIGS. 4 and 12.

Preferably, the power system housing 10 has a body 12 that is formed in either one of two alternative constructions. In a first preferred construction, the body 12 is formed as a "fuel bucket" 15 that is used for a vehicle 1 having an internal combustion engine 11, as shown in FIGS. 2-7. In a second preferred construction, the body 12 is formed as an "electric bucket" 17 that is used for a vehicle 1 having an electric motor 13, depicted in FIGS. 8-16. Both of the alternative body structures 15 and 17 include all the structural elements described above, but each body structure 15, 17 has certain differences that permit the housing 10 to be used with the energy source 2 and power components for the particular engine 11 or 13, as described below.

However, the housings 10 formed with either body structure 15 or 17 may be used with the same or a common vehicle frame 7 and rear body portion 9. As such, the vehicle 1 may be converted, for example, from a "gas" vehicle 1 to an "electric" vehicle 1 by first disconnecting the gas bucket 15, the internal combustion engine 11 and associated rear drive assembly 55 (FIG. 5) from the frame 7. Then, the electric bucket 17, electric motor 13 and corresponding rear drive assembly 57 (FIG. 13) are connected to the same frame 7, and the same rear frame portion 9 is installed about the bucket 17 and motor 13. A conversion from an electric vehicle 1 to a gas vehicle 1 may be implemented by switching the buckets 15 and 17, engines 11, 13, and drive assemblies 55, 57 in the opposite order.

Referring first to FIGS. 2-7, as discussed above, the first preferred construction of the housing body 12, the housing 10 is configured for use with a vehicle 1 having an internal combustion engine 11 mounted to the frame 7. For an internal combustion engine 11, the energy source 2 includes at least one fuel tank 5 and the power system preferably further includes a fuel filter 56, a fuel pump 58, a starter battery 60, a solenoid 62 (FIG. 4), an air intake device 64, an air filter 66 and a carburetor 68. As such, the interior space $S_H$ of the housing 10 is sized to receive at least the fuel tank 5, and is preferably further sized to also simultaneously receive or contain the other power system components 56, 58, 60, 62, 64, 66 and 68. Further, the body 12 of the fuel bucket 15 preferably has an engine opening 69 sized to receive a front portion 11a of the internal combustion engine 11. As such, when the housing 10 is mounted to the vehicle frame 7, the engine 11 extends through the opening 69 so that the engine front portion 11a is disposed within the housing interior space $S_H$. Thus, certain of the above-listed items associated with the fuel tank 5 and/or the engine 11 are directly supported by the housing body 12, the remainder being merely housed within the body interior space $S_H$ and supported by the engine 11 or the directly supported components, as described in detail below.

Referring to FIGS. 2 and 7, the base wall 18 of the fuel bucket 15 includes a central, generally triangular-shaped, horizontal section 70 of the engine opening 69 and plurality of reinforcing ribs 67 disposed between a front, innermost edge 70a of the opening section 70 and the front sidewall section 34. The base wall 18 includes two base projection assemblies 22, a left projection assembly 72 and a right projection assembly 74. The left projection assembly 72 has a relatively narrow pan 23 disposed proximal to and extending generally along substantially the entire length of the left sidewall section 38 and includes two drain holes 31. Further, the left projection assembly 72 includes four support bars 24 arranged in two front and rear pairs and used to support the fuel tank 5, as discussed below.

Further, the right projection assembly 74 includes a relatively narrow pan 23 disposed proximal to and extending along a rear section of the sidewall right section 40 and has a single drain hole 31. The right assembly 74 has two support bars 24 and a single retainer tab 25 disposed at a front end of the pan 23, the support bars 24 being used to support the starter battery 60 and the retainer tab 25 being disposeable against a front wall 60a of the battery 60. Furthermore, an elongated, support rib or rail 76 extends upwardly from the base upper surface 19 and generally parallel with the right projection assembly 74. The support rail 76 is disposed generally between the projection assembly 74 and the central opening section 70 and is disposeable against a left side wall 60b of the battery 60. A battery support surface section 78 is generally defined between the rail 76, the retainer tab 25 and the portions of the sidewall rear and left sections 36, 40, respectively, between the rail 76 and the tab 25, as indicated by dashed lines in FIG. 2.

Furthermore, a plurality of mounting holes 80, preferably three, are disposed in the base wall 18 generally between the right projection assembly 74 and the front sidewall section 34 and are arranged to attach the solenoid 62 to the base wall 18, preferably by threaded fasteners (not indicated). Preferably, the base wall 18 of the fuel bucket 15 further includes an elongated, angled side retainer projection 82 extending vertically upwardly from the base upper surface 19 and having a surface 82a disposeable against a right side surface (not indicated) of the fuel tank 5 so as to retain the fuel tank 5 disposed on a fuel tank support surface section 84, defined below. Further, the front sidewall section 34 of the fuel bucket 15 preferably includes a generally vertical front retainer projection 86. The front retainer projection 86 extends inwardly from the wall section inner surface 34a and has a vertical retainer surface 86a, an upper horizontal surface 86b and pair of mounting holes 87 extending into the upper surface 86b. The projection vertical surface 86a is disposeable against a front surface (not indicated) of the tank 5 when the tank 5 is positioned on the support surface 84 (described below). Further, the rear sidewall section 36 includes a slotted opening 88 generally aligned with the front retainer projection 86, for connecting a retainer bar 90 to the housing 10, as discussed below.

As indicated by dashed lines in FIG. 2, the tank support surface section 84 extends, from left to right, generally between the left sidewall section 38 and the side retainer projection 82. The support surface 84 further extends, from front to back, between the front retainer projection 86 and a portion 36d of the rear sidewall section 36 extending laterally between the left sidewall section 38 and a vertical section 71 of the engine opening 69. Thus, the tank support surface 84 includes the support bars 24 of the left projection assembly 72. When the fuel tank 5 is retained on the support surface 84 as described above, the tank 5 is positioned so as to be fluidly connectable with the engine 3, i.e., when the housing body 12 is connected with the vehicle 1, as discussed in further detail below. Further, to vertically secure the tank 5 upon the support surface 84, the fuel bucket housing 10 preferably includes a separate retainer bar 90 having a rear end 90b disposeable in the slotted opening 88 and a front end 90a attachable to the projection upper surface 86b, by fasteners (not indicated) inserted through the mounting holes 87. When the retainer bar 90 is so attached to the housing 10, the bar 90 is disposed against the tank upper surface 5c so as to retain the tank 5 disposed within the housing 10.

Referring to FIGS. 2-4 and 7, the front sidewall section 34 of the fuel bucket 15 further includes an air intake opening 92 extending through the wall section 34 generally beneath the F-R lever assembly 45 and a pair of mounting holes 94 disposed proximal to the intake opening 92 for mounting the intake inlet (not indicated) to the front wall section inner surface 34a. Preferably, an arcuate attenuator rib 96 projects from the wall outer surface 34b so as to extend partially about the intake opening 92, the rib 96 providing attenuation or reduction of noise generated by intake air flow. Further, the front sidewall section 34 preferably further includes two mounting holes 95 for mounting the fuel pump 58 to the front sidewall inner surface 34a. Furthermore, the front sidewall section 34 also preferably includes a U-shaped clearance hole 98 for electrical wires (none shown) extending between the solenoid (not shown) or the starter battery 62 and various systems (none indicated) of the vehicle 1 and a circular clearance hole 100 for the linkage cable (not shown) extending between the carburetor 68 to the vehicle accelerator pedal (not shown).

Referring now to FIGS. 2 and 3, the rear sidewall section 36 further includes a central, generally rectangular-shaped vertical section 71 of the engine opening 69. Due to the relatively large size of the engine opening section 71, the rear sidewall section 36 has only a relatively thin, central portion 36c extending between and connecting left and right side portions 36d, 36e, such that the rear section 36 is relatively flexible. To reinforce the rear sidewall section 36, the fuel bucket 15 preferably includes a separate reinforcing plate or bar (not shown) attached to and extending between the sidewall front and rear section 34, 36, respectively, and configured prevent bending or buckling of the rear central wall portion 36c. More specifically, the reinforcing bar has a front end attached to the front sidewall section 34 by fasteners inserted through two mounting holes 103 in a front section of the ledge 32 and a rear end connected to the rear sidewall section 36, preferably by frictionally engaging a "clip" portion of the bar to a rear section of the ledge 32.

With the specific structure of the fuel bucket, 15 described above, the various power system components for the internal combustion engine 11 may be assembled into the housing 10 in the following manner. The fuel tank 5 is placed upon the tank support surface section 84 so as to be disposed generally between the front retainer projection 82, the side retainer projection 82, the sidewall left section 38 and the rear sidewall left portion 36d. The starter battery 60 is positioned on the battery support surface section 78 so as to be located between the retainer tab 25, the support rail 76, the right sidewall section 40 and the rear sidewall right portion 36e. Further, the solenoid 62 (FIG. 4) is attached to the base wall 18 and the fuel pump 58, air intake device 64, and the F-R lever assembly 45 are each mounted to the front sidewall section 34, as described above. Preferably, the fuel tank 5 and other power system components 56, 58, 60, 62, 64 and 66 are installed within the housing interior space $S_H$, so as to be positioned for operable connection with the engine 11, prior to mounting the housing 10 to the vehicle frame 7. Alternatively, the power system housing 10 may be attached to the vehicle frame 7, and then the components 5, 56, 58, 60, 62, 64 and 66 may be assembled therein. Furthermore, the housing 10 may be removed from the vehicle 1, with all power components assembled therein, to facilitate servicing of the vehicle 1 or conversion between a gas vehicle 1 and an electric vehicle 1.

Referring now to FIGS. 8-16, as discussed above, the second preferred construction of the housing 10 includes a body 12 that is configured for use with a vehicle 1 having an electric motor 13 connected with the frame 7. For a vehicle 1 with an electric motor 13, the energy source 2 preferably includes at least one electric battery 6 and most preferably four electrolytic cell batteries 110, but may be provided by any other appropriate type of electric battery or other device for storing electric energy. Further, the "electric" vehicle 1 preferably further includes a motor controller 112, a solenoid 114, an onboard battery charger computer or "OBC" 116, a heat sink device 120 and a "run-tow" switch assembly 122. As such, the interior space $S_H$ of the housing 10 is sized to receive at least the four batteries 110, and is preferably further sized to additionally receive and contain each of the components 112, 114, 116, and 120 associated with the batteries 110 and/or the motor 13, as described in detail below.

Referring to FIGS. 8, 12 and 14-16, the base wall 18 of the electric bucket 17 preferably includes an elevated central portion 121 and four base projection assemblies 22 spaced laterally across the housing body 12, two disposed on either side of the central portion 121, as discussed below. The central portion 121 extends between the front and rear sidewall sections 34, 36 and has an upper surface 121a spaced above the remainder of the base upper surface 19, for reasons discussed below. The base central portion 121 includes a pair of horizontally-extending elongated rails 125 projecting upwardly from the upper surface 121a and providing a retainer channel 129, as discussed in further detail below. Furthermore, the base central portion 121 also has a lattice of reinforcing ribs 129 extending from a lower surface 121b and a plurality of triangular vent holes 123 extending through the base wall 18. The vent holes 123 permit air to flow into and out of the housing 10 so as to convect heat from the power components, particularly the heat sink 120 and the controller 112, as such components generate significant heat.

Two outer base projection assemblies 126 each include a relatively narrow pan 23, disposed proximal to and extending generally along the proximal right or left sidewall section 38 or 40, and a single drain hole 31. The outer projection assemblies 126 each include four relatively narrow support bars 24 arranged in front and rear pairs and a retainer tab 127 disposed centrally within the pan 23. The retainer tabs 127 each have front and rear surfaces 127a, 127b disposeable against the inner surfaces (not indicated) of two of the batteries 110 so as to help retain the batteries 110 disposed on separate battery support surfaces 130, as described below.

Further, the two inner projection assemblies 128 are each disposed between a proximal outer assembly 128 and the central rib portion 124 and includes a relatively wide pan 23 with a single drain hole 31. Each inner projection assembly 128 includes six support bars 24 and three retainer tabs 25. More specifically, the support bars 24 are relatively wide and are arranged in two groups of three bars 24 disposed on either side of a central retainer tab 132. The central tab 132 has front and rear surfaces 132a, 132b (FIG. 14) disposeable against the inner surfaces (not indicated) of two of the batteries 110, as discussed below, and two side retainer tabs 134 each having a side or lateral surface 134a disposeable against an inner lateral surface (not indicated) of one of the batteries 110.

With the above described base structure, four battery support surfaces 130 are defined on the base upper surface 19 as follows. Each support surface 130 extends laterally between the lateral surface 134a of one side tab 136 and the facing left or right sidewall section 38 or 40 and longitudinally between the central tabs 127 and 132 of the proximal outer and inner projection assemblies 126, 128 and the facing front or rear sidewall sections 36 or 38, one surface 136 being indicated by dashed lines in FIG. 14. Further, the base wall 18 of the electric bucket 17 further includes two U-shaped wall sections 140 extending from each of the central retainer tabs 132 of the inner projection assemblies 128, as best shown in FIG. 15. Each U-shaped wall section 140 extends vertically above the base wall inner surface 19 and encloses a clearance opening 142 through the base wall 18 for a battery retainer assembly 144, as described below.

With the preferred structure of the base wall 18, the electric bucket housing 10 may be sealed for applications where a sealed compartment for electrolytic batteries is mandated, in the following manner. The drain holes 31 may either omitted from the base projection assemblies 22 or if present, may be plugged by any appropriate means. Due to the upper surface 121*a* of the base central portion 121 being spaced above a remainder of the base surface 19, no fluid from the batteries 110 should be able to flow through the vent holes 123. However, such vent holes 123 may be omitted or plugged, such that at least the lower portion of the housing interior space $S_H$ is substantially fluidly sealed.

Preferably, the electric bucket housing 10 includes two battery retainer assemblies 144 that each include an upper, diamond-shaped retainer plate 146 disposeable against the upper surfaces 110*a* of two batteries 110 and a vertical retainer rod 148. The rod 148 has an upper threaded end 148*a* releasably attached to the retainer plate 146 and a lower end 148*b* that is extendable through the base clearance opening 142 and having a hook 149. Further, two brackets 150 are each attached to a separate one of the frame rails 7*a* or 7*b* and each has a curved lip 151 engageable by the hook 149 of a proximal retainer rod 148. With the above structure, the retainer plates 146 are held against the battery upper surfaces by tightening down a nut 150 on the upper end of the rod 148*a*, which forces the plate 146 against the batteries 110 while simultaneously pulling the hook 149 into the bracket lip 151. Although the electric bucket 17 preferably includes the two battery retainer assemblies 144, the batteries 110 may be held within the housing 10 by any other appropriate means, for example by horizontally-extending bars similar to the tank retainer bar 90, or may be merely placed upon the battery support surfaces 136 and supported on the base wall 18 without any fastening or retaining elements.

Figure 8:
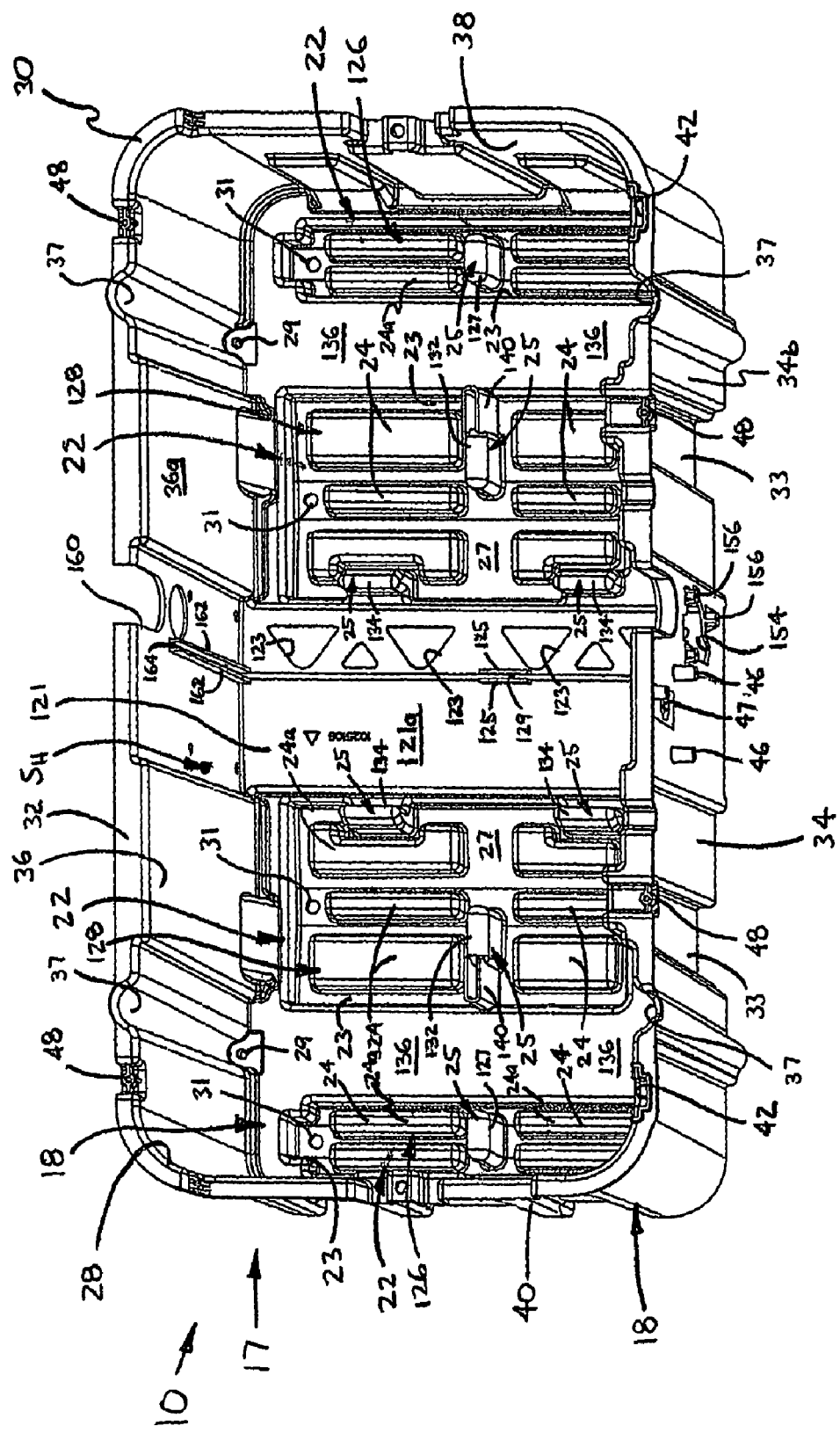
FIG. 8 is a top perspective view of a second preferred construction of the housing, or an "electric bucket", used with electric powered vehicles.
Figure 9:
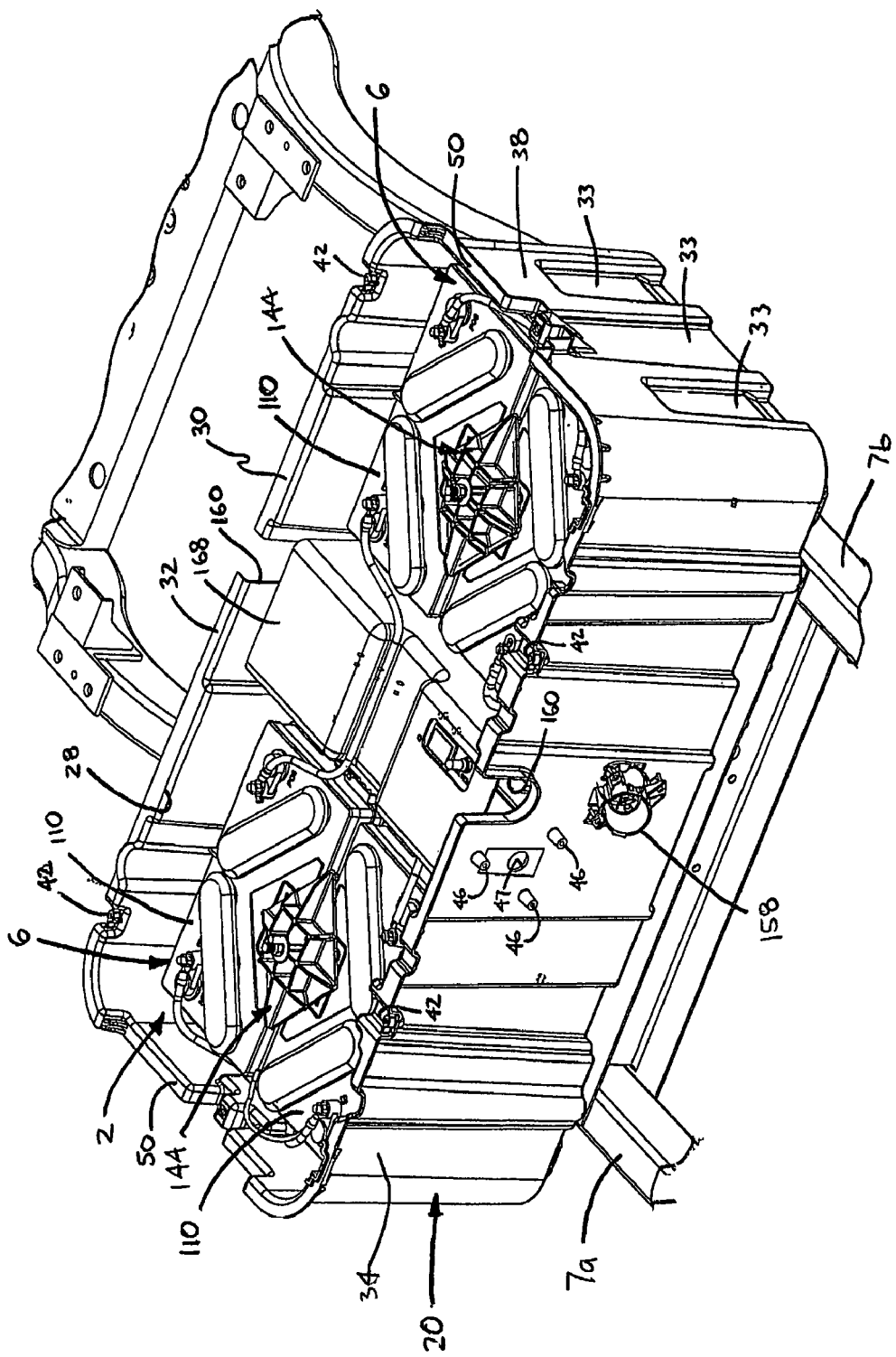
FIG. 9 is a front perspective view of the electric bucket housing, showing the housing mounted to the vehicle frame.
Figure 10:
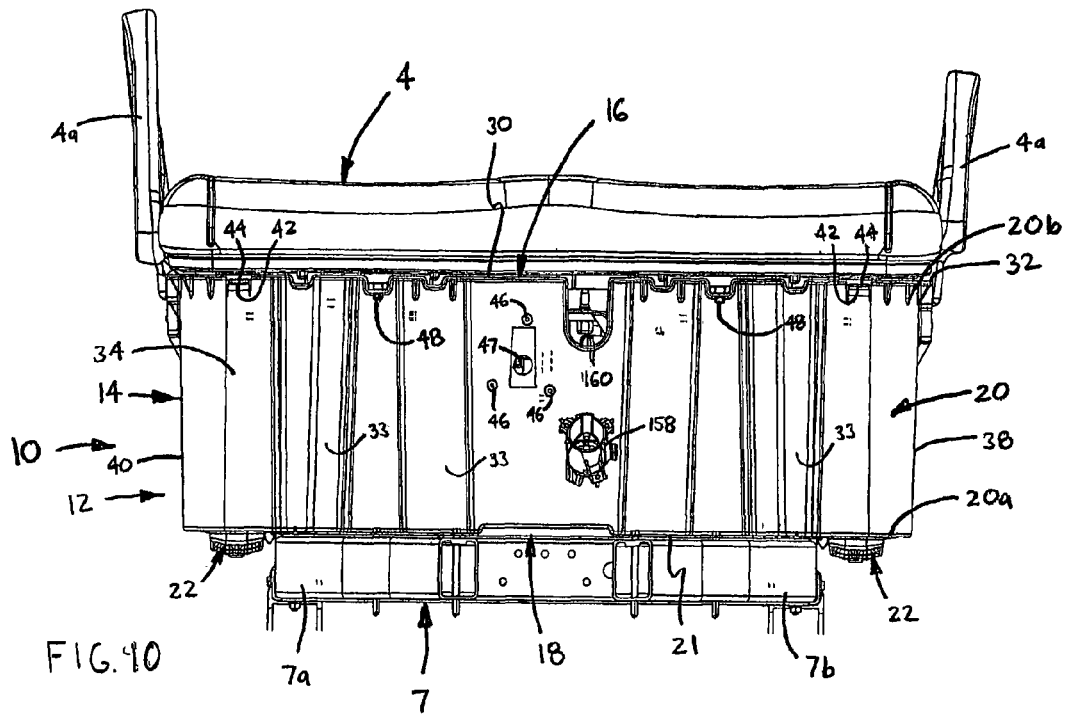
FIG. 10 is a front elevational view of the electric bucket housing, shown mounted to the vehicle frame.
Figure 11:
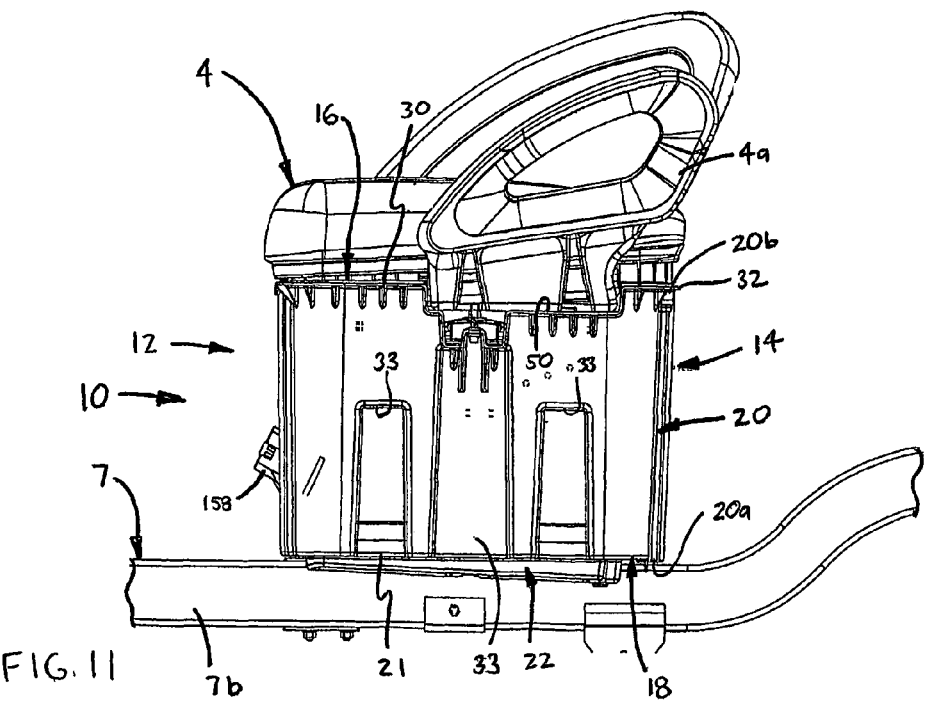
FIG. 11 is a side elevational view of the electric bucket housing, shown mounted to the frame.

Referring now to FIGS. 8-10 and 12, the front sidewall section 34 of the electric bucket housing 10 preferably further includes a generally central clearance hole 154 and a plurality of mounting holes 156 disposed about the hole 154, as best shown in FIG. 8. A charger socket 158 is disposable within the clearance hole 154 and attachable to the housing body 12 by fasteners inserted through the mounting holes 156. The charger socket 158 is electrically connected to the OBC 116, which regulates the flow of charging current to the batteries 110 from an off-vehicle battery charger (not shown). Further, the front and rear sidewall sections 34, 36, respectively, each includes a U-shaped clearance hole 160 extending downwardly from the upper ledge 32 and providing clearance for electric cables (not shown) extending between the solenoid 114 or the controller 112 and the motor 13 or other electric devices on the vehicle 1, such as the starter switch (not shown).

Figure 14:
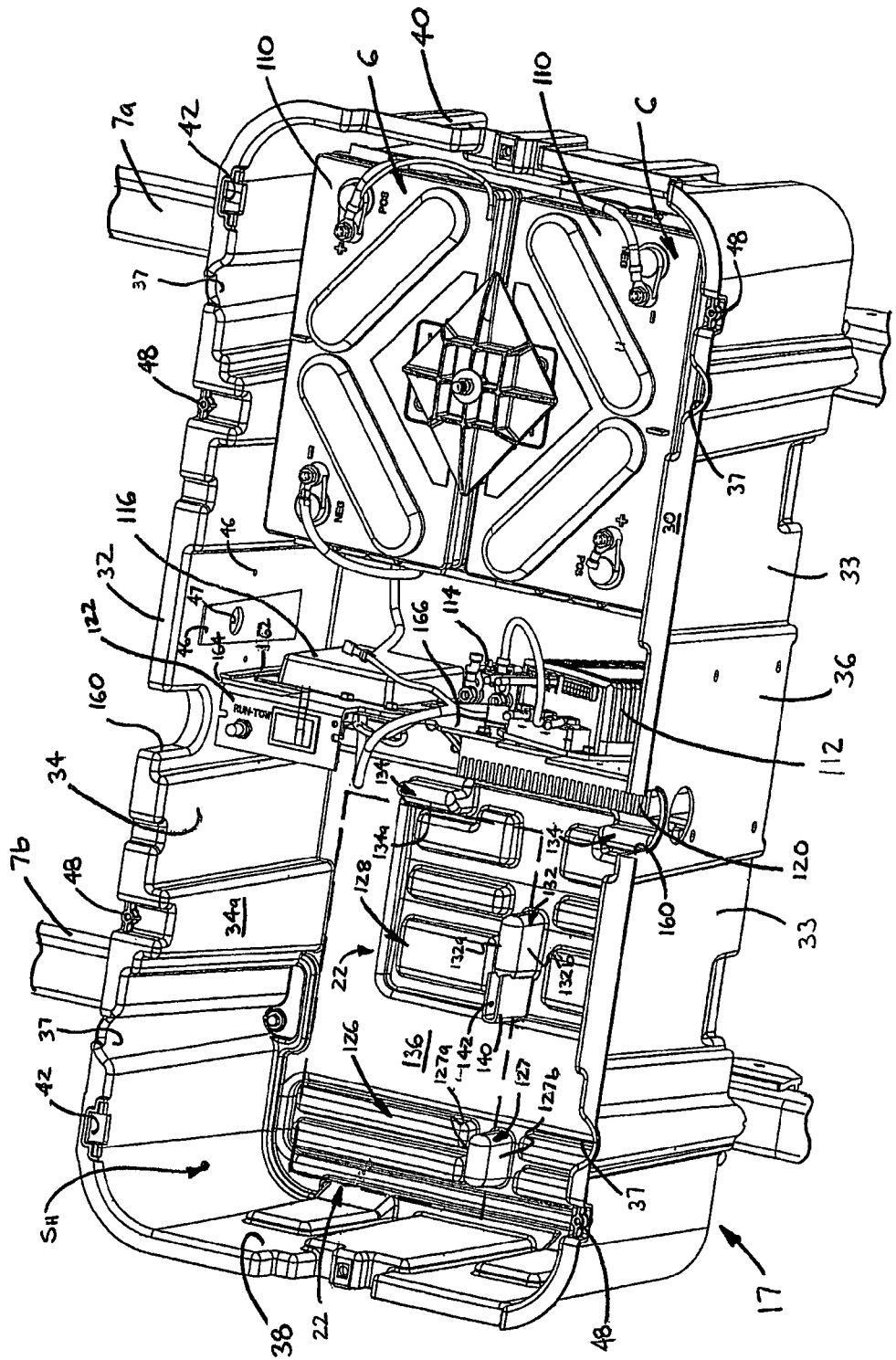
FIG. 14 is a top perspective view of the electric bucket housing, shown containing two batteries and various components of an electrical power system.
Figure 15:
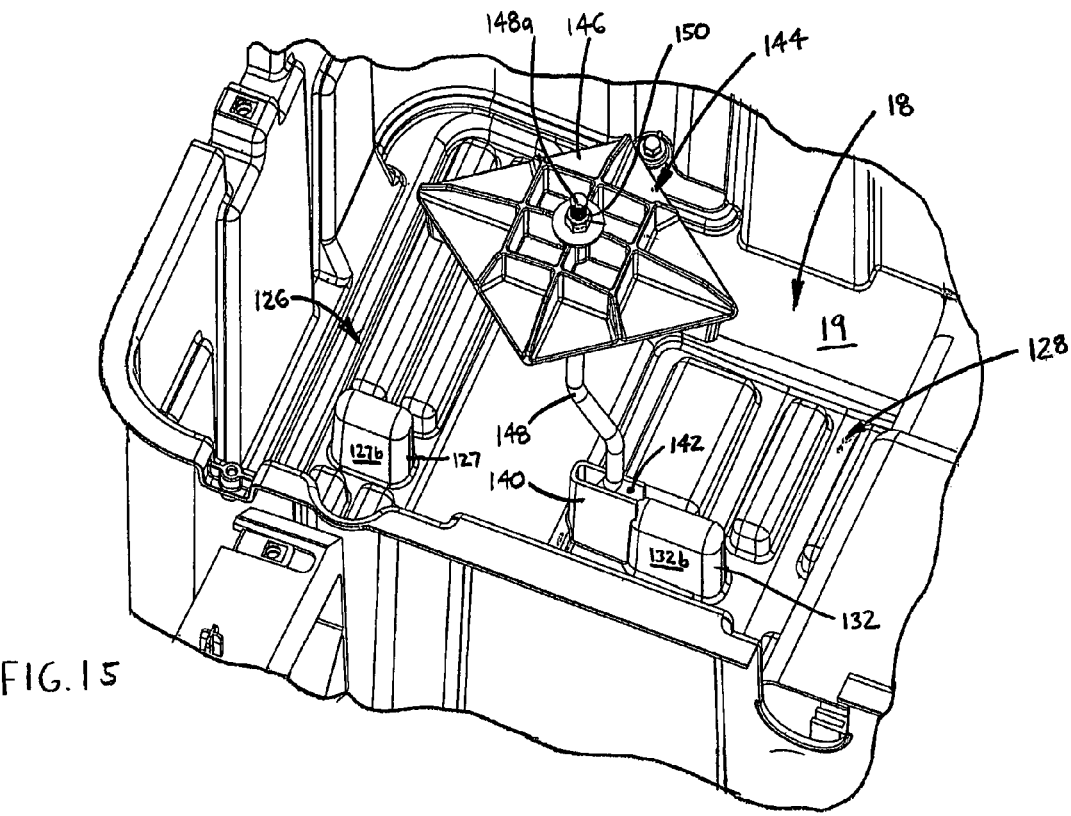
FIG. 15 is an enlarged, broken-away top perspective view of the electric bucket housing, showing a battery retainer device.
Figure 16:
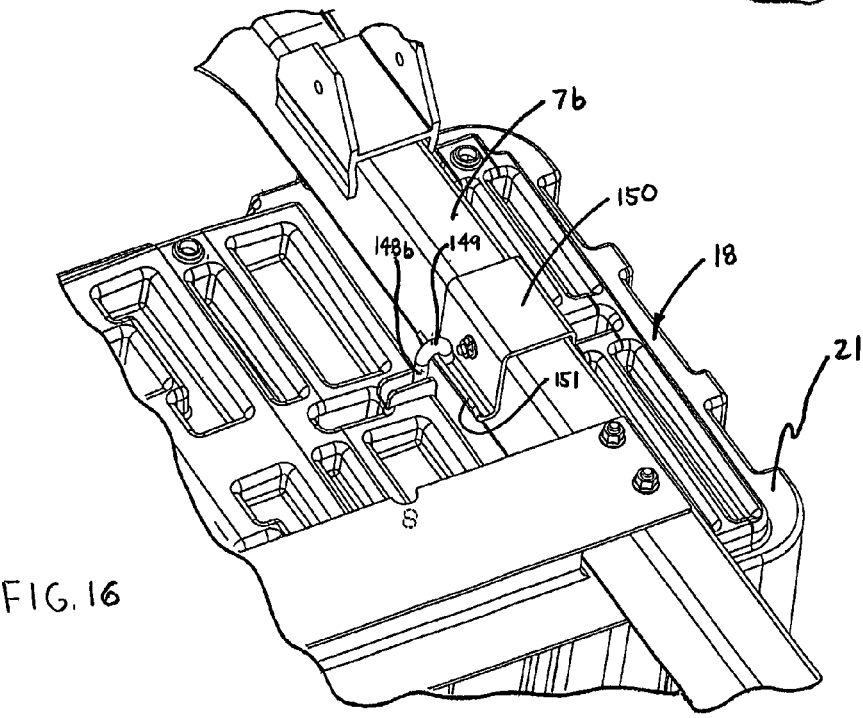
FIG. 16 is an enlarged, broken-away bottom perspective view of the electric bucket housing, showing a retainer rod engaged with a locking plate.

Referring particularly to FIGS. 8 and 14, the front and rear sidewall sections 34 and 36 each also include a pair of vertically-extending rails 162 projecting from the wall inner surfaces 34*a* and 36*a*. The two pairs of rails 162 each provide a retainer channel 164, the two channels 164 being aligned with each other and with the retainer channel 129 on the base wall central portion 121. The three aligned retainer channels 129, 136 are configured to receive a power component base plate 166 so as to retain the plate 166, and the components mounted thereon within the housing 10. More specifically, the base plate 166 is preferably generally flat and rectangular and has a lower horizontal edge (not indicated) disposeable within the base retainer channel 129 and two opposing side edges (not indicated) each disposeable within a separate sidewall retainer channel 136. As such, the plate 166 extends generally perpendicularly with respect to the base wall 18 and the front and rear sidewall sections 34 and 36. The base plate 166 is configured to support the controller 112, the solenoid 114, the OBC 116, the heat sink device 120 and the run-tow switch assembly 122, each such component being preferably removably mounted to the base plate 166 by threaded fasteners.

With the specific structure of the electric bucket 17 described above, the various power system components for the electric motor 13 may be assembled into the housing 10 in the following manner. The four preferred batteries 110 may each be placed upon a separate battery support surface 136 and are secured within the housing 10 in pairs by one of the two battery retainer assemblies 144. The controller 112, the solenoid 114, the OBC 116, the heat sink device 120 and the run-tow switch assembly 122 are each mounted to the base plate 166 and then the plate 166 is installed within the retainer channels 129, 136. Preferably, a cover plate 168 is then installed over the power components located centrally within the housing interior space $S_H$. The electric bucket housing 10 may then be connected with the vehicle frame 7 as described above, such that the batteries 110 are positioned so as to be electrically connectable with the motor 13, preferably by electric cables (none shown) extending between the controller 112 and the motor 13. As with the gas bucket 15, the electric bucket 17 may alternatively first be mounted on the vehicle 1, and then the various electric components 110, 112, 114, 116, 120, and 122 may be installed within the housing 10 when connected to the frame 7. Further, the housing 10 may be removed from the vehicle 1, with all the electric power components assembled therein, to facilitate servicing or conversion of the vehicle 1 as discussed above.

Figure 17:
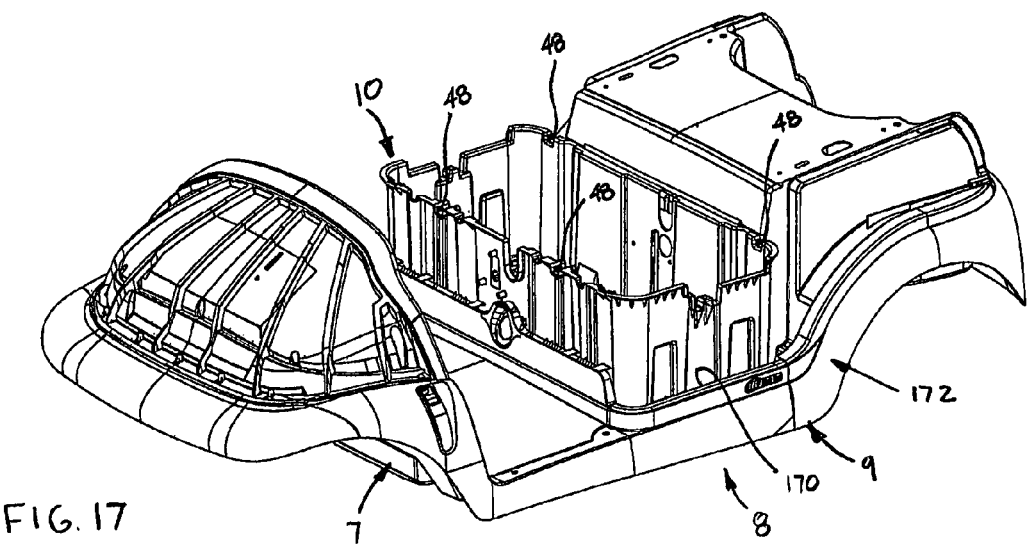
FIG. 17 is side perspective view of the electric bucket mounted to the frame, showing a vehicle body assembly disposed about the housing.
Figure 18:
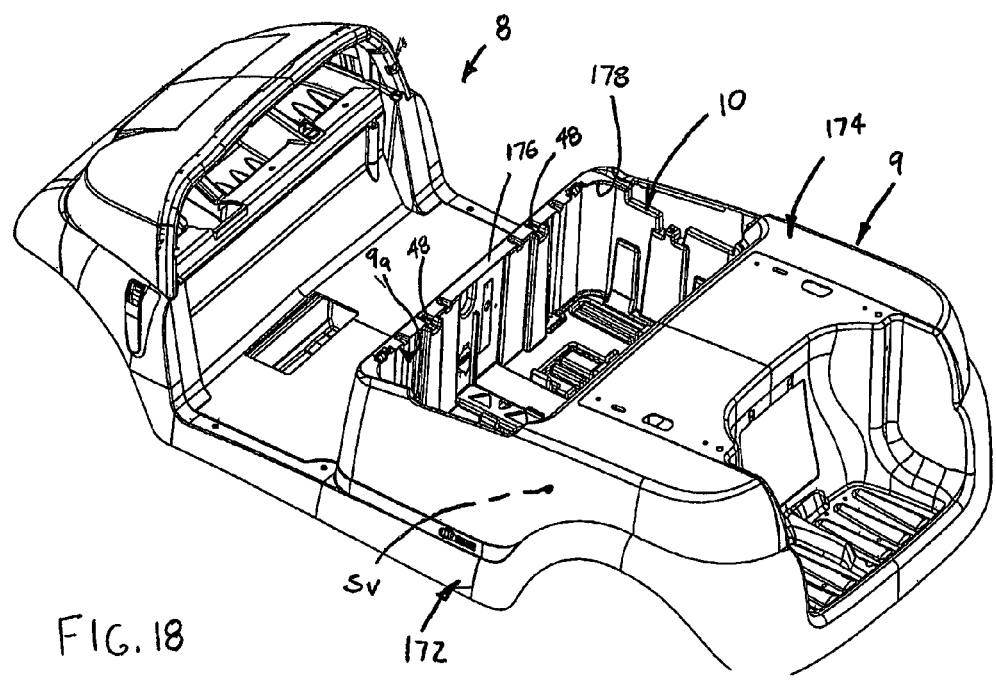
FIG. 18 is a side perspective view of the electric bucket mounted to the frame, showing a vehicle rear body panel disposed about and connected with the housing.

Referring particularly to FIGS. 17 and 18, with either the gas bucket 15 or the electric bucket 17, the power system housing 10 is preferably disposed within an opening 170 of a lower body half 172 of the rear body portion 9 when the housing 10 is connected with the vehicle frame 7. With the preferred structure of the housing 10 and rear body portion 9, either the housing or the lower body half 172 may first be connected with the frame 7, such that the body half 172 is then installed over the housing 10 or the housing 10 is inserted through the opening 170. Then, an upper body half 174 of the rear body portion 9 is disposed over the housing 10 and the lower body half 172, such that the housing 10 is disposed within the interior space (not indicated) of the body half 174. As such, a ledge portion 176 of the body half 174 is disposed upon the upper ledge 32 of the housing 10 and a body opening 178, providing rear body opening 9*a*, is generally aligned with the housing open upper end 16. The upper body 174 is then connected with the housing 10 by threaded fasteners (not indicated) inserted through the body ledge portion 176 and into the connective openings 48 in the housing ledge 32. The housing 10 thereby substantially reinforces the rear body upper half 174. Further, the seat 4 is then movably connected with the housing 10 by hinges 44, such that the housing 10 also functions to support the seat 4, as discussed above.

It will be appreciated by those skilled in the art that changes could be made to the embodiments or constructions described above without departing from the broad inventive concept thereof. It is understood, therefore, that this invention is not limited to the particular embodiments or constructions disclosed, but it is intended to cover modifications within the spirit and scope of the present invention as defined by the appended claims.

We claim:

1. A vehicle comprising:
   a frame;
   a prime mover mounted to the frame;
   a bucket-like housing removably connected to the frame, the housing defining an interior space;

a power system including an energy source positioned substantially within the interior space of the housing such that the housing supports the energy source, the energy source being connectable to the prime mover; and a seat coupled to and supported by the housing for removal from the frame with the housing, the seat generally covering the interior space of the housing when the housing is connected to and disconnected from the frame.

2. The vehicle of claim 1, further comprising a vehicle body coupled to the frame and defining a vehicle body interior space, and wherein the housing is positioned within the vehicle body interior space of the vehicle body to reinforce the vehicle body.

3. The vehicle of claim 2, wherein the vehicle body surrounds at least a portion of the housing.

4. The vehicle of claim 1, wherein the frame includes a pair of laterally spaced apart elongated rails, and wherein the housing extends across and is removably connected to the elongated rails.

5. The vehicle of claim 4, wherein the housing is removably connected to the elongated rails with threaded fasteners.

6. The vehicle of claim 1, wherein the seat is movable relative to the housing between a first position, in which the seat generally obstructs access to the interior space of the housing, and a second position, in which the seat permits access to the interior space of the housing.

7. The vehicle of claim 6, further comprising a hinge coupled to the housing and the seat, wherein the hinge pivotally couples the seat to the housing for movement between the first and second positions.

8. The vehicle of claim 1, wherein the housing includes a generally horizontal base wall and a generally vertical sidewall, and wherein the sidewall has a lower end connected to and extending about at least a portion of the base wall and an upper end defining an opening for access into the interior space.

9. The vehicle of claim 8, wherein the upper end of the sidewall provides a support surface for supporting the seat.

10. The vehicle of claim 8, wherein the sidewall includes a reinforcing recess to increase the strength and rigidity of the sidewall.

11. The vehicle of claim 8, wherein the base wall supports the energy source.

12. The vehicle of claim 8, wherein the housing is formed as a generally rectangular box.

13. The vehicle of claim 1, wherein the housing includes a drain pan having a drain hole, wherein the drain pan provides a recess for collecting fluids within the housing, and wherein the drain hole discharges fluid from the housing.

14. The vehicle of claim 1, wherein the housing includes a retainer tab, and wherein the retainer tab engages a portion of the power system to retain the portion of the power system within the housing.

15. The vehicle of claim 1, further comprising a retainer member coupled to the housing, wherein the retainer member engages the energy source to retain the energy source within the housing.

16. The vehicle of claim 1, further comprising a forward-reverse lever assembly mounted to the housing, wherein the forward-reverse lever assembly is operable to selectively drive the prime mover in one of a forward direction and a reverse direction.

17. The vehicle of claim 1, wherein the prime mover includes an internal combustion engine and the energy source includes a fuel tank.

18. The vehicle of claim 17, wherein the power system further includes an air intake device, a starter battery, a solenoid, and a fuel pump, and wherein the interior space of the housing is sized to also receive the air intake device, the starter battery, the solenoid, and the fuel pump.

19. The vehicle of claim 17, wherein the fuel tank is positioned within the housing to be fluidly connectable to the engine when the housing is connected to the frame.

20. The vehicle of claim 17, wherein the housing defines an opening, and wherein a portion of the engine extends through the opening in the housing so as to be partially disposed within the interior space of the housing when the housing is connected to the frame.

21. The vehicle of claim 1, wherein the prime mover includes an electric motor and the energy source includes a battery.

22. The vehicle of claim 21, wherein the battery is positioned within the housing to be electrically connectable to the motor when the housing is connected to the frame.

23. The vehicle of claim 21, wherein the housing includes a charger socket to facilitate charging the battery when the housing is connected to the frame.

24. The vehicle of claim 21, wherein the energy source includes a plurality of batteries.

25. A vehicle comprising:
a frame;
a prime mover mounted to the frame, the prime mover including an electric motor;
a bucket-like housing removably connected to the frame, the housing defining an interior space;
a power system including an energy source positioned substantially within the interior space of the housing such that the housing supports the energy source, the energy source being connectable to the prime mover and including a battery; and
a seat coupled to and supported by the housing for removal from the frame with the housing, the seat generally covering the interior space of the housing when the housing is connected to and disconnected from the frame;
wherein the power system further includes a controller, a solenoid, an on-board computer, a heat sink device, and a run-tow switch assembly, and wherein the interior space of the housing is sized to also receive the controller, the solenoid, the on-board computer, the heat sink device, and the run-tow switch assembly.

26. The vehicle of claim 25, further comprising a base plate, wherein the controller, the solenoid, the on-board computer, the heat sink device, and the run-tow switch assembly are mounted to the base plate, and wherein the housing includes a retainer channel for receiving the base plate.

* * * * *